United States Patent
Yoon et al.

(10) Patent No.: US 11,524,909 B2
(45) Date of Patent: Dec. 13, 2022

(54) ACCURATE BIOCIDE DOSING FOR LOW CONCENTRATION MEMBRANE BIOFOULING CONTROL APPLICATIONS

(71) Applicant: Ecolab USA Inc., Saint Paul, MN (US)

(72) Inventors: Seong-Hoon Yoon, Naperville, IL (US); Geoff Townsend, Bury St. Edmunds (GB); Bruno C. M. Fernandes, Rijswijk (NL); Alessandra Gerli, Leiden (NL); Ana Urmenyi, Utrecht (NL); Muhammad Tariq Khan, Thuwal (SA)

(73) Assignee: Ecolab USA Inc., Saint Paul, MN (US)

(*) Notice: Subject to any disclaimer, the term of this patent is extended or adjusted under 35 U.S.C. 154(b) by 0 days.

(21) Appl. No.: 17/085,905

(22) Filed: Oct. 30, 2020

(65) Prior Publication Data

US 2021/0130196 A1    May 6, 2021

Related U.S. Application Data

(60) Provisional application No. 62/929,481, filed on Nov. 1, 2019.

(51) Int. Cl.
*C02F 1/44* (2006.01)
*C02F 1/469* (2006.01)

(52) U.S. Cl.
CPC .............. *C02F 1/442* (2013.01); *C02F 1/441* (2013.01); *C02F 1/4693* (2013.01); *C02F 2209/003* (2013.01)

(58) Field of Classification Search
CPC ...... C02F 1/441; C02F 1/50; C02F 2209/003; C02F 2303/20; B01D 2311/12
See application file for complete search history.

(56) References Cited

U.S. PATENT DOCUMENTS

| | | | |
|---|---|---|---|
| 4,792,404 A | 12/1988 | Swedo et al. | |
| 4,804,478 A * | 2/1989 | Tamir | C02F 1/78 210/752 |
| 6,699,684 B2 | 3/2004 | Ho et al. | |
| 6,733,654 B1 * | 5/2004 | Itzhak | C02F 1/461 205/742 |

(Continued)

FOREIGN PATENT DOCUMENTS

| | | |
|---|---|---|
| EP | 2990386 A1 | 3/2016 |
| GB | 2326113 A | 12/1998 |

(Continued)

OTHER PUBLICATIONS

Chikako, Shimpo et al.—WO 2019031430 Machine Translation—Feb. 14, 2019 (Year: 2019).*

(Continued)

*Primary Examiner* — Bradley R Spies
(74) *Attorney, Agent, or Firm* — Fredrikson & Byron, P.A.

(57) ABSTRACT

Biocide can be controllably added to a feed stream for a membrane. In some examples, the feed stream is separated into a primary feed stream and a secondary feed stream, for example, with the secondary feed stream having a lower flow rate than the primary feed stream. The secondary feed stream may be used to monitor and control the addition of the biocide, which is then diluted when the secondary feed stream is combined with the primary feed stream to form a combined stream for delivery to the membrane.

22 Claims, 3 Drawing Sheets

(56) References Cited

U.S. PATENT DOCUMENTS

| | | | |
|---|---|---|---|
| 6,838,002 B2 | 1/2005 | Zeiher et al. | |
| 7,476,320 B1 * | 1/2009 | Koons | B09C 1/002 |
| | | | 210/747.7 |
| 8,101,083 B2 | 1/2012 | Ruehr et al. | |
| 9,079,137 B2 | 7/2015 | Sim et al. | |
| 2005/0061741 A1 | 3/2005 | Mainz et al. | |
| 2008/0149570 A1 | 6/2008 | Zeiher et al. | |
| 2010/0096326 A1 | 4/2010 | Najmy et al. | |
| 2014/0083931 A1 | 3/2014 | Chang et al. | |
| 2016/0271565 A1 | 9/2016 | Liu et al. | |

FOREIGN PATENT DOCUMENTS

| | | |
|---|---|---|
| WO | 0048943 A1 | 8/2000 |
| WO | 2004009497 A2 | 1/2004 |
| WO | 2005009908 A2 | 2/2005 |
| WO | 2008091453 A1 | 7/2008 |
| WO | 2013051192 A1 | 4/2013 |
| WO | 2014176082 A1 | 10/2014 |
| WO | 2019031430 A1 | 2/2019 |
| WO | 2019036787 A1 | 2/2019 |

OTHER PUBLICATIONS

Kim, Dooil, et al. "Biocide application for controlling biofouling of SWRO membranes—an overview." Desalination 238.1-3 (2009): 43-52. (Year: 2009).*

Sheikholeslami, R., and J. Bright. "Silica and metals removal by pretreatment to prevent fouling of reverse osmosis membranes." Desalination 143.3 (2002): 255-267. (Year: 2002).*

A Literature Review of the Effects of ClO2 and RO Membranes, Siemens Water Technologies, 2009, 4 pages.

Adams, "The Effects of Chlorine Dioxide on Reverse Osmosis Membranes," Desalination, vol. 78, 1990, pp. 439-453.

Al-Abri et al., "Chlorination disadvantages and alternative routes for biofouling control in reverse osmosis desalination," NPJ Clean Water, vol. 2, No. 2, Jan. 16, 2019, 16 pages.

Cran et al., "Degradation of polyamide reverse osmosis membranes in the presence of chloramine," Desalination, vol. 283, 2011, pp. 58-63.

Eriksson et al., "Field Experience: Can Chlorine Dioxide Be Used as a Biocide in RO Plants?" IDA Journal, First Quarter 2012, pp. 14-20.

FILMTEC Membranes Cleaning and Sanitization: Sanitizing RO & NF Membrane Systems, Tech Manual Excerpt, The Dow Chemical Company, published prior to Nov. 1, 2019, 2 pages.

Hoek, Ph.D, "Reverse Osmosis Membrane Biofouling: Causes, Consequences and Countermeasures," Water Planet, Inc., Jul. 13, 2017, 9 pages.

Ohno et al., "Effect of coexisting metal ions on the degradation of polyamide reverse osmosis membrane by hypochlorite treatment," Desalination, vol. 381, 2016, pp. 126-134.

Tseng et al., "Chlorine dioxide application for microbial control on polyamide membranes during seawater desalination," Long Beach Water Department, American Water Works Association 2009 Water Quality Technology Conference, Powerpoint and paper, Nov. 15-18, 2009, 47 pages.

You et al., "Control of Metal Oxide Fouling in Reverse Osmosis," IWA North American Membrane Research Conference, IDA Journal, First Quarter 2008, 10 pages.

International Patent Application No. PCT/US2020/058341, International Search Report and Written Opinion dated Feb. 15, 2021, 14 pages.

* cited by examiner

ACCURATE BIOCIDE DOSING FOR LOW CONCENTRATION MEMBRANE BIOFOULING CONTROL APPLICATIONS

RELATED MATTERS

This application claims the benefit of U.S. Provisional Patent Application No. 62/929,481, filed Nov. 1, 2019, the entire contents of which are incorporated herein by reference.

TECHNICAL FIELD

This disclosure relates to membrane systems and, more particularly, to the control of biofouling in membrane systems.

BACKGROUND

Membrane separation is a technology that selectively separates materials via pores and/or minute gaps in the molecular arrangement of a continuous membrane structure. Membrane separations can be classified by pore size and by the separation driving force. Example membrane separation techniques include microfiltration (MF), ultrafiltration (UF), ion-exchange (IE), nanofiltration (NF), and reverse osmosis (RO). For example, reverse osmosis is widely used in water purification processes to remove ions, bacteria, and other molecules and larger particles from the water. In a reverse osmosis process, an applied pressure is used to overcome an osmotic pressure across the membrane, allowing substantially pure solvent (e.g., water) to pass through the membrane while a residual solute is retained on the pressurized side of the membrane.

In practice, the degree of purification achieved using the membrane separation process is dictated, at least in part, by the quality and integrity of the membrane used in the process. If there are chemical and/or mechanical failures to the membrane structure, impurities can pass through the membrane breach and into the resulting "purified" product stream. In the case of water purification, harmful impurities and pathogens (e.g., waterborne enteric viruses, *Cryptosporidium, Giardia* cysts, nanoparticles, organic compounds, and so forth), which can be in the nanosize range, can pass through the membrane breach into the clean water stream, potentially creating health risks.

One issue that can impact the quality of a membrane separation process is biofouling. Biofouling can occur when microbes grow on the surface of the membrane. When biofouling occurs on surface of a reverse osmosis membrane or nanofiltration membrane, the biofouling can negatively impact the osmotic pressure of the membrane. Biofouling can also reduce the flow rate and quality of the water produced by the membrane. As a result, during the operation of the membrane system, one or more chemicals may be applied to control biofouling.

SUMMARY

In general, this disclosure is directed to systems and techniques for controlling the addition of a biocide to a membrane separation process. In some examples, a feed stream for a membrane in the membrane separation process is separated into a primary feed stream and a secondary feed stream, for example, with the secondary feed stream having a lower flow rate than the primary feed stream. The feed stream may be separated into the primary feed stream and the secondary feed stream by dividing the feed stream into the two separate streams or by providing two separate streams that are subsequently joined together. In either case, the secondary feed stream may be used to monitor and control the addition of a biocide for the membrane separation process.

For example, a biocide may be added to the secondary feed stream in an amount effective to provide a target concentration of biocide in the feed stream supplied to the membrane, once the secondary feed stream is combined with and diluted by the primary feed stream. A sensor may measure the concentration of biocide in the secondary feed stream and provide a measured concentration of biocide in that secondary feed stream. This measured concentration of biocide in the secondary feed stream can then be used to control a biocide pump, e.g., to increase or decrease the addition rate of the biocide to the secondary feed stream.

Controlling addition of a biocide to a secondary feed stream in accordance with some examples of the present disclosure may be useful to provide a more accurate and reliable biocide concentration in the feed stream than if the biocide is delivered directly to the feed stream. In practice, the desired concentration of biocide in the feed stream may be very low, such as less than 1 ppm or less than 0.01 ppm. At these comparatively low concentrations, a small drift in the accuracy of the sensor measuring the biocide concentration in the feed stream and that is used to control the biocide addition pump may cause gross changes in the amount of biocide added to the feed stream. The accuracy of the sensor measuring the concentration of biocide may change over time from the value reported in its specifications for various reasons, such as gradual chemical degradation of the sensor, fouling, drift in electronic components, and/or yet other reasons. In this regard, the accuracy error of the sensor is the difference between the true value of the parameter being measured and the reading provided by the sensor, regardless of the source or cause of the error. In either case, at a comparatively low concentration of biocide in the feed stream, a drift in sensor measurement accuracy of +/−0.1 ppm, for example, may cause the biocide pump to stop adding biocide or greatly increase the amount of biocide added where the target biocide concentration is only 0.1 ppm, for example. This is undesirable and may not be readily corrected through increased calibration frequency. Increasing the frequency of sensor calibration to maintain measurement accuracy is often not desirable for continuous process control goals. Moreover, at low concentrations of biocide, a long calibration period may be needed for the sensor to achieve stable readings.

By providing a secondary stream having a lower flow rate that is then joined with a primary stream to form the feed stream, biocide may be delivered to the secondary stream at a higher concentration than the concentration targeted in the higher flow rate feed stream. The target concentration for the secondary feed stream can vary depending on the flow rate of the secondary feed stream relative to the overall flow rate of the feed stream. In some examples, however, the target concentration of biocide for the secondary feed stream can be an order of magnitude or greater than the concentration of biocide intended for the feed stream (once the secondary feed stream is diluted with the primary feed stream to form the overall feed stream). As a result, changes in the accuracy of the sensor measuring the concentration of biocide in the secondary feed stream for controlling the biocide pump may be less impactful than if the same accuracy changes occur when measuring the concentration of biocide directly in the feed stream.

For example, if the target concentration of the biocide in the secondary feed stream is 2.0 ppm (which is then diluted down to an example target concentration of 0.1 ppm in the feed stream once the secondary and primary feed streams are combined together), the same example sensor measurement accuracy change of +/−0.1 ppm discussed above can result in a secondary feed stream biocide concentration of 1.9 ppm or 2.1 ppm, which only changes the concentration of biocide in the feed stream by +/−0.05 ppm. This is significantly less impactful than the change in biocide addition that would otherwise occur if controlling the addition of biocide to the feed stream based on the measured concentration of biocide in the feed stream directly, as discussed above. This arrangement can therefore account for real-world limitations in maintaining accuracy.

In one example, a method of controlling addition of a biocide in a membrane separation process is described. The method includes providing a feed stream having a feed stream flow rate for a membrane, the feed stream being formed by joining a primary feed stream having a primary feed stream flow rate and a secondary feed stream having a secondary feed stream flow rate less than the primary feed stream flow rate. The method further involves measuring a concentration of a biocide in the secondary feed stream downstream of a biocide addition location to provide a measured concentration of the biocide in the secondary feed stream and controlling addition of the biocide to the secondary feed stream based on a secondary feed stream biocide target concentration and the measured concentration of the biocide in the secondary feed stream. In addition, the method involves contacting the membrane with the feed stream.

In another example, a system is described that includes a membrane, a primary fluid pathway configured to supply a primary feed stream, and a secondary fluid pathway configured to supply a secondary feed stream. The primary fluid pathway and the secondary fluid pathway join together to provide a feed stream having a combined flow rate for supply to the membrane. The system also includes a biocide pump configured to introduce a biocide into the secondary fluid pathway at a biocide addition location. The system further includes a sensor configured to measuring a concentration of a biocide in the secondary feed stream flowing through the secondary fluid pathway to provide a measured concentration of the biocide in the secondary feed stream, the sensor being positioned downstream of biocide addition location. The example system also includes a controller communicatively coupled to the biocide addition pump and the sensor. The controller is configured to receive the measured concentration of the biocide in the secondary feed stream from the sensor, and control the biocide pump based on the measured concentration of the biocide in the secondary feed stream and a secondary feed stream biocide target concentration.

The details of one or more examples are set forth in the accompanying drawings and the description below. Other features, objects, and advantages will be apparent from the description and drawings, and from the claims.

DETAILED DESCRIPTION

This disclosure is generally directed to systems and technique for controlling addition of a biocide to a membrane separation process having one or more membrane separation devices. The membrane separation device may be a reverse osmosis membrane (RO), a nanofiltration membrane (NF), or other type of membrane separation device, such as an ultrafiltration membrane (UF), microfiltration membrane (MF) and/or electrodialysis (ED) membrane. The form of the membrane is not limited, and any type of membrane module may be used such as spiral wound type membrane module, hollow-fiber membrane module, tubular type membrane module, and plane type membrane module. Although the membrane separation process can be used for any desired application, the separation process may commonly be deployed for water treatment and the preparation of water such as drinking water, pure water, ultra-pure grade water, process water for electricity, electronic and/or semiconductor industries, process water for the medical field, water for agents, water for injection, aseptic pyrogen-free pure water, process water of food and beverage uses, water for a boiler, and/or water for washing and cooling. A membrane separation processes can also be applied to fields such as the desalination of seawater or brackish water.

In water treatment applications, a polluting substance, solubilized substance, and/or ionic substance existing in the water to be treated may be separated using the above various kinds of membrane separation devices. In operation, however, microbes present in the water to be treated may deposit on the piping line and/or on the surface of membrane in the membrane separation device. This can result in the formation of a biofilm and biofouling, which may influence the osmotic pressures between two sides of the membrane. This can impact the water yield passing through the membrane, block the membrane, and/or deteriorate the efficiency of the treatment for impurities.

In general, this disclosure describes systems and techniques for controlling the addition of one or more biocides to water upstream of a membrane separation device. The biocide may be added in an amount effective to inhibit biofouling growth in the membrane separation device and/or remove accumulated biofouling in a membrane separation device. In some examples, the biocide is delivered to the membrane separation device by supplying the biocide to a secondary feed stream separated from a primary feed stream that is also delivered to the membrane separation device.

For example, a feed stream for the membrane separation device may be divided into two or more individual feed streams upstream of the membrane separation device that are then combined together to form a composite feed stream before the membrane separation device. Biocide can be delivered to a secondary feed stream to achieve a target biocide concentration in the secondary feed stream that, when the secondary feed stream is diluted with the primary feed stream, provides a desired amount of biocide in the combined feed stream delivered to the membrane separation device. A sensor may be used to measure the concentration of biocide in the secondary feed stream downstream of a biocide addition location. This measured biocide concentration in the secondary feed stream can then be used to control the addition of biocide to the secondary feed stream to achieve a target concentration for the secondary stream.

Figure 1:
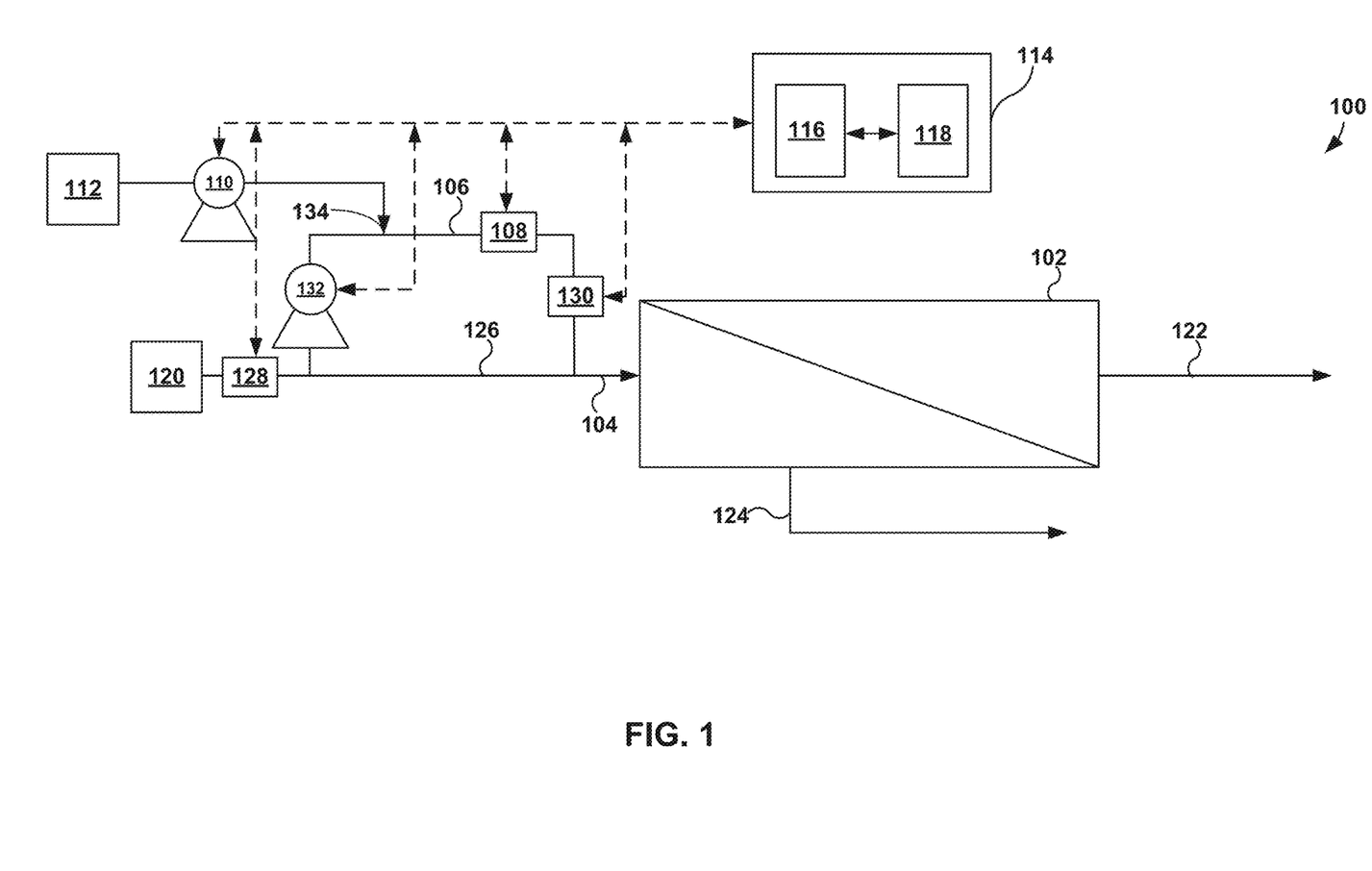
FIG. 1 is a diagram illustrating an example membrane separation system for controlling the addition of a biocide according to the disclosure.

FIG. 1 is a conceptual diagram illustrating an example membrane separation system 100 in which a biocide is controllably added. System 100 includes a separation membrane 102 that receives a feed stream from a fluid pathway 104. System 100 also includes a secondary fluid pathway 106 in which a portion of the fluid that forms the feed stream supplied to the separation membrane is conveyed. In the illustrated example, a sensor 108 can measure a concentration of a biocide in a secondary feed stream flowing through the secondary fluid pathway 106. A biocide pump 110 can pump a biocide 112 into the secondary feed stream based on the concentration of biocide measured by sensor 108. A controller 114 can be communicatively coupled to various components within membrane separation system 100 to manage the overall system.

For example, controller 114 can be communicatively connected to sensor 108, biocide pump 110, and optionally any other controllable components or sensors that may be desirably implemented in system 100. Controller 114 can include processor 116 and memory 118. Controller 114 can communicate with controllable components in system 100 via connections. For example, signals generated by sensor 108 may be communicated to controller 114 via a wired or wireless connection, which in the example of FIG. 1 is illustrated as a wired connection. Memory 118 can store software for running controller 114 and may also store data generated or received by processor 116, e.g., from sensor 108. Processor 116 can run software stored in memory 118 to manage the operation of system 100.

As described in greater detail below, biocide 112 can be delivered to the feed stream supplied to separation membrane 102 via fluid pathway 104 by controlling the addition of the biocide to a secondary feed stream supplied through secondary fluid pathway 106 (which is also referred to as "secondary feed stream 106" herein). Operating under the control of controller 114, sensor 108 may measure a concentration of biocide in the secondary feed stream downstream of an injection location where biocide 112 is introduced into the secondary feed stream. This can provide a measured biocide concentration in the secondary feed stream. Controller 114 may control biocide pump 110 to adjust an addition rate of the biocide to the secondary feed stream based on the measured biocide concentration.

For example, controller 114 may receive a target biocide concentration for the feed stream that is supplied to separation membrane 102 via fluid pathway 104. Controller 114 may determine a secondary feed stream biocide target concentration based on the target biocide concentration for the overall or combined feed stream supplied to separation membrane. Controller 114 may then control biocide pump 110 based on the concentration of biocide measured via sensor 108 and a target biocide concentration for the secondary feed stream (also referred to as a secondary feed stream target biocide concentration). Controller 114 may control biocide pump 110 to deliver an amount of biocide to the secondary feed stream which, when the secondary feed stream is diluted to form the feed stream flowing through fluid pathway 104, provides the target biocide concentration in the feed stream.

During operation of system 100, membrane 102 can be contacted with fluid to be purified from source 120 to remove ion, molecules, pathogens, and/or other particulate contaminants. For example, a feed stream flowing through fluid pathway 104 to membrane 102 can contain various solutes, such as dissolved organics, dissolved inorganics, dissolved solids, suspended solids, the like or combinations thereof. Membrane 102 can treat or purify the feed stream supplied to the membrane by dividing the feed stream into at least a first stream and a second stream, such as a permeate stream 122 and a concentrate stream 124 (which may also be referred to as a reject stream).

Upon separation of the feed stream into permeate stream 122 and concentrate stream 124, in membrane 102, the permeate stream can contain a substantially lower concentration of dissolved and/or suspended solutes as compared to the feed stream. On the other hand, the concentrate stream 124 can have a higher concentration of dissolved and/or suspended solutes as compared to the feed stream. In this regard, the permeate stream 122 represents a purified feed stream, such as a purified aqueous feed stream.

System 100 and membrane 102 can be configured for any desired type of membrane separation process, including cross flow separation processes, dead-end flow separation processes, reverse osmosis, ultrafiltration, microfiltration, nanofiltration, electrodialysis, electrodeionization, pervaporation, membrane extraction, membrane distillation, membrane stripping, membrane aeration and the like or combinations thereof. Typically, however, system 100 and membrane 102 may be implemented as a reverse osmosis, ultrafiltration, microfiltration, or nanofiltration membrane separation process.

In reverse osmosis, the feed stream is typically processed under cross flow conditions. When so configured, the feed stream may flow substantially parallel to the membrane surface such that only a portion of the feed stream diffuses through the membrane as permeate. The cross flow rate is typically high in order to provide a scouring action that lessens membrane surface fouling. This can also decrease concentration polarization effects (e.g., concentration of solutes in the reduced-turbulence boundary layer at the membrane surface, which can increase the osmotic pressure at the membrane and thus can reduce permeate flow). The concentration polarization effects can inhibit the feed stream water from passing through the membrane as permeate, thus decreasing the recovery ratio, e.g., the ratio of permeate to applied feed stream. A recycle loop(s) may be employed to maintain a high flow rate across the membrane surface.

System 100 can employ a variety of different types of membranes as membrane 102. Such commercial membrane element types include, without limitation, hollow fiber membrane elements, tubular membrane elements, spiral-wound membrane elements, plate and frame membrane elements, and the like. For example, reverse osmosis typically uses spiral wound elements or modules, which are constructed by winding layers of semi-porous membranes with feed spacers and permeate water carriers around a central perforated permeate collection tube. Typically, the modules are sealed with tape and/or fiberglass over-wrap. The resulting construction may have one channel that can receive an inlet flow. The inlet stream flows longitudinally along the membrane module and exits the other end as a concentrate stream. Within the module, water can pass through the semi-porous membrane and is trapped in a permeate channel, which flows to a central collection tube. From this tube it can flow out of a designated channel and is collected.

In different applications, membrane 102 can be implemented using a single membrane element or multiple membrane elements depending on the application. For example, multiple membrane elements may be used forming membrane modules that are stacked together, end to end, with inter-connectors joining the permeate tubes of the first module to the permeate tube of the second module, and so on. These membrane module stacks can be housed in pressure vessels. Within the pressure vessel, the feed stream can pass into the first module in the stack, which removes a portion of the water as permeate water. The concentrate stream from the first membrane can then become the feed stream of the second membrane and so on down the stack. The permeate streams from all of the membranes in the stack can be collected in the joined permeate tubes.

Within most reverse osmosis systems, pressure vessels may be arranged in either "stages" or "passes." In a staged membrane system, the combined concentrate streams from a bank of pressure vessels can be directed to a second bank of pressure vessels where they become the feed stream for the second stage. Commonly, systems have two to three stages with successively fewer pressure vessels in each stage. For example, a system may contain four pressure vessels in a first stage, the concentrate streams of which feed two pressure vessels in a second stage, the concentrate streams of which in turn feeds one pressure vessel in the third stage. This is designated as a "4:2:1" array. In a staged membrane configuration, the combined permeate streams from all pressure vessels in all stages may be collected and used without further membrane treatment. Multi-stage systems are commonly used when large volumes of purified water are required, for example for boiler feed water. The permeate streams from the membrane system may be further purified by ion exchange or other means.

In a multi-pass system, the permeate streams from each bank of pressure vessels are collected and used as the feed to the subsequent banks of pressure vessels. The concentrate streams from all pressure vessels can be combined without further membrane treatment of each individual stream. Multi-pass systems are typically used when very high purity water is required, for example in the microelectronics or pharmaceutical industries. When system 100 is implemented as a reverse osmosis process, one or more membranes 102 may be configured as a multi-stage and/or multi-pass system.

While system 100 and membrane 102 may be implemented as cross-flow filtration process, in other configurations, the system may be arranged for conventional filtration of suspended solids by passing the feed stream through a filter media or membrane in a substantially perpendicular direction. This arrangement can create one exit stream (e.g., purified stream 122) during the service cycle. Periodically, the filter may be backwashed by passing a clean fluid in a direction opposite to the feed, generating a backwash effluent containing species that have been retained by the filter. In this arrangement, system 100 may have a feed stream, a purified stream, and a backwash stream. This type of membrane separation is typically referred to as dead-end flow separation and is typically limited to the separation of suspended particles greater than about one micron in size.

In the arrangement of FIG. 1, liquid from source 120 to be processed by membrane 102 can be separated into a primary feed stream 126 (flowing through a primary fluid conduit, which may be referred to as "primary fluid pathway 126") and secondary feed stream 106. Secondary feed stream 106 may branch off a main conduit supplying the combined flow, forming the primary feed stream 126 and the secondary feed stream 106, as illustrated in FIG. 1. In other examples (FIG. 2), primary feed stream 126 and secondary feed stream 106 may be separately supplied from one or more sources 120 upstream of separation membrane 102. In either case, secondary feed stream 106 may be combined with the primary feed stream 126 to provide a combined feed stream (or recombined feed stream in instances where the secondary feed stream was divided from the original, combined feed stream) that is supplied to separation membrane 102.

In general, secondary feed stream 106 may have a volumetric flow rate less than the flow rate of the primary feed stream 126. The flow rate of secondary feed stream 106 can be referred to as a secondary feed stream flow rate. The overall feed stream 104 supplied to separation membrane 102 can have a feed stream flow rate, which is equal to the combined flow rate of the primary feed stream 126 and the secondary feed stream 106. Broadly, the secondary feed stream flow rate may range from 0.000005% to 50% of the combined feed stream flow rate. In different implementations, the secondary feed stream flow rate may be less than 50% of the feed stream flow rate, such as less than 25% of the feed stream flow rate, less than 10% of the feed rate, less than 2% of the feed stream flow rate, less than 1% of the feed stream flow rate, less than 0.5% of the feed stream flow rate, or less than 0.1% of the feed stream flow rate. The secondary feed stream flow rate may be set based on the accuracy and operating range of sensor 108, for example, to provide a secondary feed stream flow rate that corresponds to a secondary feed stream biocide target concentration substantially in the middle of the target operating range of sensor 108.

System 100 includes one or more sensors 108, which in the illustrated example is shown as a single sensor, to measure a concentration of biocide 112 in secondary feed stream 106. Sensor 108 can be positioned to measure the concentration of biocide 112 at a location downstream of a biocide addition location where biocide pump 110 adds the biocide to the secondary feed stream 106. A variety of different sensor instruments may be used as sensor 108. In general, any sensor that can measure a concentration of biocide 112 in the secondary feed stream can be used as sensor 108. Example sensors that may be used to sensor 108 include, but are not limited to, an electrochemical sensor, an amperometic sensor, a potentiometric sensor, a coulometric sensor, a colorimetric sensor, an optical sensor, and combinations thereof.

In practice, and independent of the specific type of sensor selected for use as sensor 108, the accuracy of the sensor may change over time from the value reported in the design specification for the sensor. For example, at startup, sensor 108 may be calibrated so that the sensor provides a measured biocide concentration corresponding to the true or absolute value of the biocide concentration. Over time, a drift in sensor 108 accuracy may occur so that the sensor provides a measured biocide concentration that is different from the true or absolute value of the biocide concentration present in the feed stream. This drift may be caused by a variety of reasons, including internal hardware and/or software changes (e.g., signal drifting caused by changes and use of the electronics of the sensor) and/or external changes to the sensor (e.g., fouling and/or corrosion where the sensor contacts liquid).

For example, common causes of measurement errors for sensors include fouling and/or changes in the electrical resistances of the internal sensor hardware. Fouling can occur when organic and/or inorganic deposits form on the sensor-liquid interface of the sensor, e.g., due to microbial attachment and growth on surface, scale formation such as $CaCO_3$, $CaSO_4$, silica, etc. Gradual changes in the electrical resistances of the sensor circuit board(s) can occur due to the burn out of electrical component(s) or other electrical component changes. In the case of electrochemical sensors, additional causes of measurement accuracy errors may include the loss or degradation of reagents filled in certain types of sensors, gradual contamination of membrane separators for certain types of sensors, and/or gradual oxidation or corrosion of electrodes for certain type of sensors.

In different examples, sensor 108 may have a measurement accuracy that varies from the accuracy of the sensor at calibration by at least 0.05 ppm, such as by at least 0.1 ppm, at least 0.2 ppm, at least 0.3 ppm, or by at least 0.5 ppm. For example, sensor may have a measurement accuracy that varies from the accuracy of the sensor at calibration by an amount falling within a range from 0.1 ppm to 0.3 ppm. By way of example, a sensor having a measurement accuracy that varies by at least 0.1 ppm following calibration may provide a measured biocide concentration of 1.9 ppm or less or 2.1 ppm or greater when measuring a sample having a true or absolute biocide concentration of 2.0 ppm (which may be the concentration the sensor is calibrated to report and does measure immediately after calibration).

Controller 114 can control the addition of biocide 112 to secondary feed stream 106 based on a secondary feed stream target biocide concentration and a measured concentration of the biocide in secondary feed stream 106 measured by sensor 108. Controller 114 can compare the concentration of biocide in secondary feed stream 106 measured by sensor 108 to the secondary feed stream target biocide concentration (e.g., stored in memory 118). Based on the comparison, controller 114 can control biocide pump 110 to adjust an addition rate of biocide 112 to the secondary flow stream. In different examples, controller 114 may control biocide pump 110 to start the pump, to stop the pump, or to increase or decrease an addition rate of biocide 112 provided by biocide pump 110 relative to a baseline introduction rate.

In some examples, controller 114 is provided with a target biocide concentration against which the biocide concentration measured by sensor 108 is compared without accounting for flow rate changes in system 100. For example, controller 114 may be informed of a target biocide concentration for feed stream 104 and/or secondary feed stream 106 from a user via a user interface (which can be physically coupled to or remote from and communicatively coupled to controller 114). This may be appropriate in examples where the secondary feed stream flow rate and the flow rate of the combined feed stream 104 are substantially constant. In other examples, controller 114 may receive information indicating the flow rate of the feed stream 104 and the secondary feed stream 106 and determine the target biocide concentration for the secondary feed stream based on the flow rates.

Controller 114 may receive an indication of the flow rate of the feed stream 104 and the secondary feed stream 106 in a variety of different ways. In the illustrated example of FIG. 1, system 100 is illustrated as including a feed stream flow meter 128 and a secondary feed stream flow meter 130. Secondary flow meter 130 can measure a flow rate of the liquid passing through the secondary fluid pathway. Feed stream flow meter 128 can measure a flow rate of the combined feed stream supplied to membrane 102, e.g., upstream of where secondary feed stream 106 branches from the feed stream and/or downstream of where secondary feed stream 106 and primary feed stream 126 combine and/or even downstream of membrane 102 in other examples. In another implementation, feed stream flow meter 128 may measure the flow rate of primary feed stream 126, thereby providing an indication of the flow rate of the combined feed stream (by providing a primary feed stream flow rate that can be added to the secondary flow stream flow rate, for example by controller 114, to provide a combined flow stream flow rate).

Additionally or alternatively, controller 114 may be communicatively connected to one or more pumps in system 100 and may receive an indication of the flow rate of a particular feed stream based on an operating rate of a pump providing that feed stream. In the configuration of FIG. 1, system 100 is illustrated as including a pump 132 for pumping the secondary feed stream 106 through the secondary fluid pathway. Pump 132 may include a draw side that extracts fluid from the fluid pathway through which the combined feed stream flows and a discharge side the discharge is pressurized fluid through the secondary fluid pathway. In some implementations, system 100 may include a pump (not illustrated) that draws fluid from source 120 discharges the pressurized fluid to provide the primary fluid stream and/or combined fluid stream. In either case, controller 114 may be informed of a flow rate flowing through various fluid pathways of system 100 based on a known operating rate of one or more pumps and a known fluid flow rate corresponding to the operating rate, e.g., which may be stored in memory 118.

In use, an operator of system 100 may desire that feed stream 104 contain a certain amount of biocide, e.g., effective to provide biocidal efficacy and microbial control to the system. For these and other reasons, the operator may set a target concentration for the feed stream 104. Controller 114 may be informed of the target concentration for the feed stream in various ways. The target concentration may be programmed into controller at manufacturing or set up, and/or once deployed within system 100. Controller 114 may be informed of the target concentration from a user via a user interface communicatively coupled to the controller (e.g., on-site or from a location remote from where the controller is located) or may receive information concerning the target concentration from one or more other systems or sensors within the operating environment where system 100 is located.

Controller 114 may determine a target concentration for the biocide in the secondary feed stream 106 based on the target concentration received for the combined feed stream 104 and the relative flow rates of the combined feed stream and the secondary feed stream. For example, controller 114 may calculate a secondary feed stream biocide target concentration based on the following equation:

$$C_{Side\ Target} = C_{Feed\ Target} \times \frac{Q_{Feed}}{Q_{Side}} \qquad \text{Equation 1}$$

In the equation above, $C_{Side\ Target}$ is the secondary feed stream biocide target concentration, $C_{Feed\ Target}$ is the target biocide concentration for the feed stream, $Q_{Feed}$ is the measured feed stream flow rate, and $Q_{Side}$ is the measured secondary feed stream flow rate.

System 100 can operate with any desired target biocide concentrations in feed stream 104. For example, a target biocide concentration for feed stream 104 may be of value falling within a range from 0.001 ppm to 10 ppm, such as from 0.001 ppm to 1 ppm. In various examples, the target biocide concentration for feed stream 104 may be a value less than 10 ppm, such as less than 1 ppm, less than 0.1 ppm, or less than 0.05 ppm.

The secondary feed stream biocide target concentration may vary depending on the relative flow rates of the secondary feed stream 106 and the combined feed stream 104 and the target biocide concentration for the combined feed stream. In some examples, the secondary feed stream target biocide concentration is a value falling within a range from 0.1 ppm to 10,000 ppm, such as from 0.1 ppm to 100 ppm, or from 0.1 ppm to 10 ppm. For example, the secondary feed stream target biocide concentration may be at least 0.1 ppm, such as a concentration greater than 1 ppm, a concentration greater than 3 ppm, or a concentration greater than 5 ppm. Depending on the implementation, the secondary feed stream biocide target concentration may be at least 10 times the value of the target biocide concentration for feed stream 104, such as at least 20 times the value, at least 30 times the value, at least 50 times the value, or at least 100 times the value.

Independent of whether controller 114 calculates a secondary feed stream biocide target concentration or is directly informed (e.g., programmed) with the secondary feed stream biocide target concentration, the controller can control biocide pump 110 to add biocide 112 to the secondary feed stream based on the target concentration. Controller 114 can compare the biocide concentration measured in secondary feed stream 106 by sensor 108 to the secondary feed stream biocide target concentration. If the measured concentration is less than the target concentration, controller 114 may control biocide pump 110 to increase an addition rate of biocide 112. By contrast, if the measured concentration is greater than the target concentration, controller 114 may control biocide pump 110 to decrease the addition rate of biocide 112.

Sensor 108 used in system 100 can be implemented in a number of different ways in the system. In some examples, a pipe, tube, or other conduit is connected between a fluid pathway through which the secondary feed stream flows to the sensor, e.g., providing a slip stream or sample stream from the bulk of flowing liquid. As fluid moves through the secondary fluid pathway, a portion of the fluid may enter the conduit and pass adjacent to and/or in contact with sensor 108, thereby allowing the sensor to measure a concentration of biocide in the fluid. In alternative configurations, sensor 108 can be positioned in-line with a secondary fluid pathway, e.g., allowing the sensor to directly sample and/or analyze the secondary feed stream flowing through the fluid pathway without drawing a slip stream. In still other applications, sensor 108 may be used to analyze a stationary volume of fluid that does not flow through and/or in contact with the sensor. For example, in these alternative configurations, sensor 108 may be implemented as an offline monitoring tool (e.g., as a handheld sensor), that requires filling the sensor with a fluid sample manually extracted from system 100.

In general, sensor 108 may be positioned to measure a concentration of biocide 112 at a location downstream of where the biocide is added to secondary feed stream 106. In the illustrated example of FIG. 1, biocide pump 110 is illustrated as introducing biocide 112 into secondary feed stream 106 at a biocide addition location 134. Sensor 108 can measure the biocide concentration in the secondary feed stream 106 at a location downstream of the biocide addition location 134. Sensor 108 may analyze a portion of the secondary feed stream 106 at a location sufficiently far away from biocide addition location 134 that the biocide has substantially uniformly distributed (e.g., mixed) throughout the secondary feed stream before being analyzed by sensor 108. As examples, sensor 108 may be located at least 0.5 m downstream from biocide addition location 134, such as at least 1 m, at least 2 m, or at least 5 m.

Any suitable biocide or combination of biocides can be used as biocide 112 in system 100. Biocide 112 may include an oxidizing biocide and/or a non-oxidizing biocide, which in each case may include a halogen such as bromine or chlorine. Example chlorine and bromine-type oxidizers that be used as biocide 112 include: chlorine, chlorine dioxide, hypochlorous acid and the salts thereof, chlorous acid and the salts thereof, chloric acid and the salts thereof, perchloric acid and the salts thereof, chlorinated isocyanuric acid and the salts thereof, hypobromous acid and the salts thereof, bromous acid and the salts thereof, bromic acid and the salts thereof, perbromic acid and the salts thereof, brominated isocyanuric acid and the salts thereof, and combination thereof. As salts, the alkali metal salts of hypochlorous acid and hypobromous acid such as sodium hypochlorite, sodium hypobromite, potassium hypochlorite and potassium hypobromite; the alkaline earth metal salts of hypochlorous acid and hypobromous acid such as calcium hypochlorite, calcium hypobromite, barium hypochlorite and barium hypobromite; the alkali metal salts of chlorous acid and bromous acid such as sodium chlorite, sodium bromite, potassium chlorite and potassium bromite; the alkaline earth metal salts of chlorous acid and bromous acid such as calcium chlorite, calcium bromite, barium chlorite and barium bromite; other metal salts of chlorous acid and bromous acid such as nickel chlorite; ammonium chlorate and ammonium bromate; the alkali metal salts of chloric acid and bromic acid such as sodium chlorate, sodium bromate, potassium chlorate and potassium bromate; the alkaline earth metal salts of chloric acid and bromic acid such as calcium chlorate, calcium bromate, barium chlorate and barium bromate can be listed. One of these chlorine and bromine-type oxidizers can be used alone or two or more of these chlorine and bromine-type oxidizers can be combined to use.

Example non-oxidizing biocides that may be used as biocide 112 include bromine-containing biocides, such as 2,2-dibromo-3-nitrilopropionamide (DBNPA) and 2-bromo-2-nitro-1,3-propanediol ("bronopol"). Another example non-oxidizing biocides that may be used as biocide 112 is isothiazolone.

In some examples, biocide 112 is selected from the group consisting of chlorine, chlorine dioxide, chloramine (e.g., monochoramine), bromine, stabilized bromine, and combinations thereof. A stabilized bromine can be bromine combined with one or more of sulfamic acid, cyauric acid, ammonia, and dimethylhydantoin, including combinations thereof. For instance, in various examples, the biocide 112 introduced into secondary feed stream 106 may consistent essentially of chlorine, or may consistent essentially of chlorine dioxide, or may consist essentially of chloramine.

Biocide 112 may be supplied from any type of source reservoir including, e.g., a pail, a drum, a cylinder, a tote, solid feeder system, and/or a hands-free delivery chemical delivery system, such as PORTA-FEED® from Nalco, an Ecolab Company. The reservoir may store a liquid, a solid (e.g., powder), and/or a gas. In examples in which biocide 112 is provided in a solid and/or gaseous form, biocide pump 110 may be replaced with a different type of metering device configured to deliver the gas and/or solid chemical agent to an intended discharge location.

System 100 can be used to purify any desired type of fluid. Example aqueous (water-based) liquid feed sources 120 that may be purified using system 100 include raw water streams (e.g., extracted from a fresh water source), waste water and recycle water streams (e.g., from municipal and/or industrial sources), streams in food and beverage processes, streams in pharmaceutical processes, streams in electronic manufacturing, streams in utility operations, streams in pulp and paper processes, streams in mining and mineral processes, streams in transportation-related processes, streams in textile processes, streams in plating and metal working processes, streams in laundry and cleaning processes, streams in leather and tanning processes, streams in paint processes, and combinations thereof. Liquid from source 120 may include microorganisms that have a tendency to cause fouling in system 100, such as bacteria (e.g., *Legionella, Shigella, Escherichia coli, Vibrio, Salmonella, Mycobacterium,* Pseudomonads), viruses (e.g., Norwalk virus, rotaviruses), protozoans (e.g., *Entamoeba, Giardia, Cryptosporidium*), and combinations thereof.

In some examples, liquid feed source 120 may provide an aqueous liquid feed that contains comparatively high levels of metal ions. At least a portion of these metal ions may be removed by membrane 102 by contacting the membrane with the feed liquid. When using an oxidizing biocide 112 (e.g., chloramine, chlorine dioxide, hydrogen peroxide, peroxyacetic acid, performic acid), however, one or more metal ions present in the liquid feed may function as a catalyst that catalyzes oxidation reactions with the membrane 102 itself (material forming the membrane) by biocide 112. This can cause premature degradation and failure of membrane 102.

Accordingly, in some implementations, the feed liquid for membrane 102 supplied by liquid feed source 120 may be analyzed to measure a concentration of one or more metal ions present in the liquid. The one or more metal ions may be metal ions that catalyze degradation (e.g., oxidation) reactions with membrane 102. Examples of such metal ions may include iron, manganese, aluminum, cobalt, molybdenum, silver, zinc, copper, nickel, chromium, and combinations thereof. In one example, the feed liquid is analyzed to measure a total metal ion concentration in the feed liquid, which is a sum of the concentrations of each of the metal ions catalyzing degradation reactions with membrane 102 (e.g., a sum of the concentrations of each of the foregoing listed metal ions).

The concentration of the metal ion(s) in the feed liquid can be measured using a number of different instruments and techniques. The concentration of one or more metals can be measured using one or more in-line sensors and/or offline sensors, e.g., as discussed herein. The concentration of one or more metals may be measured using an optical sensor (e.g., with or without titration), electrochemical sensor, spectroscopy, chromatography, and/or using any other measurement instrumentation.

The concentration of a measured metal ion, or a combined concentration of multiple metal ions (e.g., total metal ion concentration), can be compared against a threshold. The threshold may correspond to a metal ion concentration in the feed liquid above which one or more pretreatment steps may be implemented to reduce the metal ion concentration in the feed liquid prior to contacting membrane 102. In various examples, the threshold may be a metal ion concentration (either for a single metal ion or for a combination of multiple metal ions) of 1.0 ppm metal or less, such as 0.5 ppm or less, 0.2 ppm or less, or 0.1 ppm or less. Pretreatment can be implemented if the measured metal ion concentration in the feed liquid exceeds the threshold. For example, if the threshold corresponds to a total metal ion concentration 0.2 ppm, pretreatment may be implemented if the measured total metal ion concentration in the feed liquid exceeds 0.2 ppm. In some examples, a system controller (e.g., control 114) receives measurement information from one or more instruments providing a measured metal ion concentration, compares the measured metal ion concentration to the threshold, and initiates pretreatment based on the comparison.

One or more pretreatment steps can be implemented upstream of membrane 102 that condition the feed liquid from source 120 to reduce the concentration of one or more metal ions in the feed liquid. One example pretreatment step that can be implemented is the addition of a chemical agent to the feed liquid that deactivates the catalytic activity of the one or more metal ions (e.g., by binding the one or more metal in-situ and/or by forming a metal ion-containing precipitate that is removed from the feed liquid). Examples of such chemical agents include coagulants, chelating agents, and the like. Additionally or alternatively, a pre-filtration step may be implemented upstream of membrane 102 to remove metal ions from the feed liquid prior to contacting the membrane. Example pre-treatment steps may include, but are not limited to sand filtration, multimedia filtration, microfiltration (MF), ultrafiltration (UF), and combinations thereof. The one or more pretreatment steps may be effective to reduce the concentration of the one or more metal ions in the feed liquid from a concentration level above the threshold to a concentration level at or below the threshold.

Features describes as pumps in system 100 (e.g., biocide pump 110) may be any form of pumping mechanism that supplies fluid from a fluidly connected reservoir. For example, the pump may comprise a peristaltic pump or other form of continuous pump, a positive-displacement pump, or any other type of pump appropriate for the particular application.

Features described as fluid pathways in system 100 may be any type of flexible or inflexible tubing, piping, or conduit. The fluid pathways may typically be formed of metal (e.g., copper, steel such as stainless steel, lead), polymeric and crosslinked polymeric material (e.g., polyvinyl chloride, polypropylene, polyethylene), and/or ceramic materials. Oftentimes, each fluid pathway may be implemented with multiple individual segments of piping joined together with fluid-tight connections.

As discussed above, liquid from source 120 to be processed by membrane 102 can be separated into primary feed stream 126 and secondary feed stream 106. In the example illustrated in FIG. 1, secondary feed stream 106 branches off a main conduit supplying the combined flow of the two streams, forming the primary feed stream 126 and the secondary feed stream 106.

Figure 2:
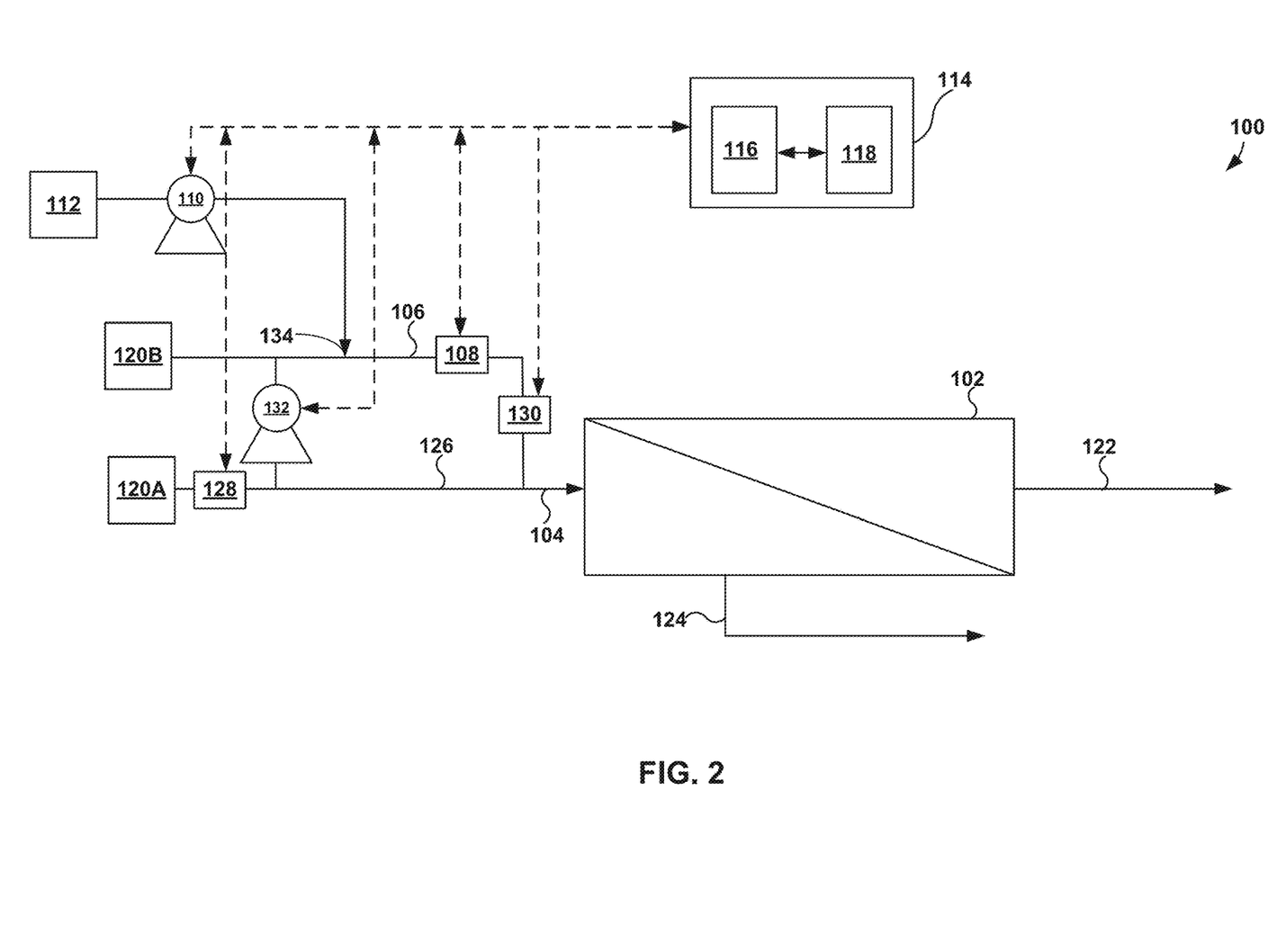
FIG. 2 is a diagram illustrating an alternative arrangement of a membrane separation system where a primary feed stream and a secondary feed stream are separately supplied from one or more sources upstream of a separation membrane.

FIG. 2 is a diagram illustrating an alternative arrangement of a membrane separation system 200 where primary feed stream 126 and secondary feed stream 106 are separately supplied from one or more sources 120 upstream of separation membrane 102 instead of being divided from a main fluid pathway supplying the combined flow of the two streams. Like reference numerals in FIG. 2 refer to like elements discussed above with respect to FIG. 1. Membrane separation system 200 in FIG. 2 is identical to membrane separation system 100 in FIG. 1 except that primary feed stream 126 and secondary feed stream 106 originate as separate streams rather than as a single stream that is divided to produce the two streams As illustrated in FIG. 2, primary feed stream 126 is supplied by a first source 120A. Secondary feed stream 106 is supplied by a second source 120B. First and second sources 120A, 120B may be the same source of liquid (e.g., with different fluid conduits for the primary and secondary feed streams being connected to the source) or may be different sources of liquid. First source 120A and second source 120B may each be any of the sources of liquid that can be processed in a membrane separation system as described herein.

Figure 3:
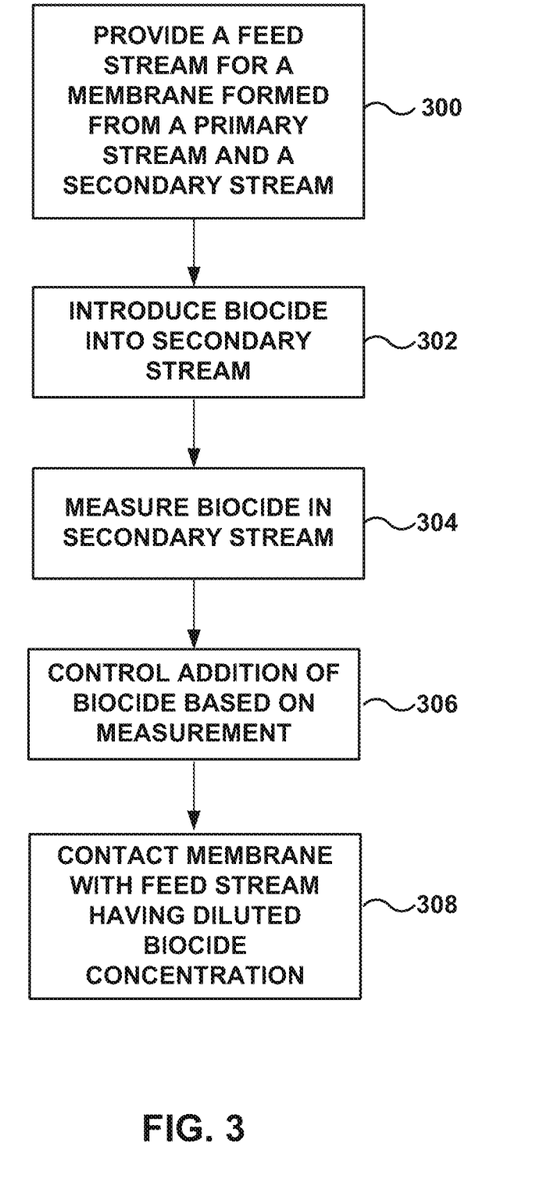
FIG. 3 is a flow diagram illustrating an example technique for controlling addition of a biocide in a membrane separation process.

FIG. 3 is a flow diagram illustrating an example technique for controlling addition of a biocide in a membrane separation process. The technique of FIG. 3 is scribed with reference to systems 100 and 200 in FIGS. 1 and 2, although can be performed in other systems having other configurations, e.g., as described herein.

With reference to FIG. 3, the example technique involves providing a feed stream for a membrane separation device that is formed through the combination of a primary feed stream and a secondary feed stream (300). The primary feed stream in the secondary feed stream may can flow separately upstream of the membrane separation device through different fluid pathways and join together at a junction between the separate fluid pathways to form a combined flow have a flow rate equal to that of the primary feed stream and the secondary feed stream.

For example, liquid to be processed through membrane 102 can be pumped from a source 120 through a fluid conduit toward the membrane. Secondary fluid pathway 106 can draw a portion of the flow rate off of the fluid conduit, thereby forming a primary feed stream 126 and a secondary feed stream 106. The secondary feed stream 106 may typically have a volumetric flow rate less than that of primary feed stream 126. Primary feed stream 126 and secondary feed stream 106 can flow through separate respective fluid conduits before joining together at a junction between the fluid conduits, thereby forming a combined feed stream 104 that is supplied to membrane 102.

Alternatively, the primary feed stream 126 and the secondary feed stream 106 may separately originate from one or more sources providing liquid to be processed by membrane 102. Again, the secondary feed stream 106 may have a volumetric flow rate less than that of the primary feed stream 126. Primary feed stream 126 and secondary feed stream 106 can flow from their origin locations through separate respective fluid conduits before joining together at a junction between the fluid conduits, thereby forming a combined feed stream 104 that is supplied to membrane 102.

The technique of FIG. 3 includes introducing a biocide into the secondary feed stream 106 (302). Operating under the control of controller 114, biocide pump 110 may pump an amount of biocide 112 into secondary feed stream 106. The biocide may be added to the secondary feed stream 106 at a biocide addition location 134, which may be a location along the length of the secondary feed stream fluid conduit where a biocide addition conduit intersects the feed stream conduit.

One or more sensors 108 can analyze at least a portion of the secondary feed stream 106 downstream of the biocide addition location 134 to determine a measured biocide concentration in the feed stream (304). The biocide concentration measured by sensor 108 may vary at any time after successful calibration of the sensor, e.g., as a drift in the accuracy of the sensor has occurred. Accordingly, the concentration measured by sensor 108 may be a first value if the sensor was recently calibrated but a second value different from the first value if the sensor was not recently calibrated.

In either case, controller 114 may control the addition of biocide 112 to secondary feed stream 106 based on the biocide concentration measured by sensor 108 and a secondary feed stream target biocide concentration (306). In some examples, controller 114 is informed of a target biocide concentration for the combined feed stream supplied to membrane 102 and determines a corresponding target biocide concentration for the secondary feed stream. For example, controller 114 may receive an indication of the volumetric flow rate of the secondary feed stream 106 relative to the overall or combined feed stream supplied to membrane 102. Controller 114 can determine the target biocide concentration for the secondary feed stream based on the relative flow rate of the secondary feed stream to the combined feed stream supplied to membrane 102 and the target biocide concentration for the combined feed stream.

Controller 114 can control biocide pump 110 based on the comparison between the secondary feed stream target biocide concentration and the measured biocide concentration. Controller 114 may start biocide pump 110 or increase a biocide addition rate by pump 110 if the measured biocide concentration is below the target concentration. By contrast, controller 114 can stop biocide pump 110 or decrease a biocide addition rate by the pump if the measured biocide concentration is above the target concentration.

With the biocide 112 introduced into the secondary feed stream 106 based on the measured biocide concentration by sensor 108, the secondary feed stream containing biocide can flow downstream to combine with the primary feed stream 126 (e.g., which may be substantially or entirely devoid of biocide 112). Upon combination, the biocide in the secondary feed stream 106 may be diluted with the additional volume of liquid from the primary feed stream 126 to provide a combined feed stream having a target biocide concentration less than the secondary feed stream target biocide concentration. The feed stream containing the target biocide concentration can then flow to and contact membrane 102 to affect separation (308).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components.

Rather, functionality associated with one or more modules or units may be performed by separate hardware or software components, or integrated within common or separate hardware or software components. For example, features described as controllers herein such as controller 114 using computing hardware physically co-located with membrane 102 or may be partially or fully physically remote from the membrane, such as implemented through a remote server, cloud-computing environment, or other physically remote computing device.

The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The following prophetic examples may provide additional details about membrane separation systems and biocide control techniques according to the disclosure.

EXAMPLES

A commercially available sensor can quantify a $ClO_2$ biocide within a concentration range of 0.1 to 10 ppm as $ClO_2$. The sensor may experience inaccuracy over time due to signal drifting, sensor fouling/ageing, and/or normal fluctuations in electrical circuits. The sensor is implemented in membrane separation system 100 or 200 described above. A target dosage for the side-stream is 3 ppm while QF is 300 L/min and Qf is 10 L/min according to Equation 1. A target concentration of 0.1 ppm is desired for the main feed line (combined flow).

If the sensor signal drifts by +0.3 ppm, the deviation from the target dosage in the main feed line is only +0.01 ppm. In contrast, if biocide were injected directly to the main feed stream and quantified by the same sensor, the 0.1 ppm concentration might be able to be achieved at the beginning of operation since the target is still at the lower end of the sensor's range. However, if the signal drifts by +0.3 ppm, the biocide may not be fed at all because the reading is 0.4 ppm, which is above the target dosage of 0.1 ppm.

As another example, if the target concentration for the main feed line is 0.01 ppm, the sensor described above cannot quantify the biocide in the main feed line because it is below the operating range of the sensor. However, the 0.01 ppm target concentration in the main feed line can be achieved by setting a target dosage for the side-stream of 1 ppm while setting QF at 1,000 L/min and Qf at 10 L/min according to Equation 1 above. As a result, the target concentration in the side stream of 1 ppm is within the operating range of the sensor while still achieving the 0.01 ppm concentration for the main feedline.

The invention claimed is:

1. A method of controlling addition of a biocide in a membrane separation process, the method comprising:
providing a feed stream having a feed stream flow rate for a membrane, the feed stream being formed by joining a primary feed stream having a primary feed stream flow rate and a secondary feed stream having a secondary feed stream flow rate less than the primary feed stream flow rate;
measuring a concentration of a biocide in the secondary feed stream downstream of a biocide addition location to provide a measured concentration of the biocide in the secondary feed stream;
controlling addition of the biocide to the secondary feed stream based on a secondary feed stream biocide target concentration and the measured concentration of the biocide in the secondary feed stream; and
contacting the membrane with the feed stream.

2. The method of claim 1, further comprising determining the secondary feed stream biocide target concentration based on a target biocide concentration for the feed stream.

3. The method of claim 2,
further comprising measuring a flow rate of the feed stream to provide a measured feed stream flow rate and measuring the secondary feed stream flow rate to provide a measured secondary feed stream flow rate,
wherein determining the secondary feed stream biocide target concentration further comprises determining the secondary feed stream biocide target concentration based on a ratio of the measured feed stream flow rate to the measured secondary feed stream flow rate.

4. The method of claim 3, wherein determining the secondary feed stream biocide target concentration comprises determining the secondary feed stream biocide target concentration according to an equation:

$$C_{Side\ Target} = C_{Feed\ Target} \times \frac{Q_{Feed}}{Q_{Side}}$$

wherein $C_{Side\ Target}$ is the secondary feed stream biocide target concentration, $C_{Feed\ Target}$ is the target biocide concentration for the feed stream, $Q_{Feed}$ is the measured feed stream flow rate, and $Q_{Side}$ is the measured secondary feed stream flow rate.

5. The method of claim 2, wherein:
the target biocide concentration for the feed stream is less than 1 ppm, and
the secondary feed stream biocide target concentration is greater than 1 ppm.

6. The method of claim 2, wherein a ratio of the secondary feed stream biocide target concentration divided by the target biocide concentration for the feed stream is at least 50.

7. The method of claim 1, wherein the secondary feed stream flow rate is less than 10 percent of the feed stream flow rate.

8. The method of claim 1, wherein measuring the concentration of the biocide comprises measuring the concentration of the biocide with a sensor selected from the group consisting of an electrochemical sensor, an amperometic sensor, a potentiometric sensor, a coulometric sensor, an colorimetric sensor, an optical sensor, and combinations thereof.

9. The method of claim 1, wherein the biocide is selected from the group consisting of chlorine, chlorine dioxide, chloramine, bromine, stabilized bromine, and combinations thereof.

10. The method of claim 9, wherein the biocide consists essential of chlorine dioxide.

11. The method of claim 1, wherein providing the feed stream by joining the primary feed stream and the secondary feed stream comprises:
dividing the feed stream into the primary feed stream and the secondary feed stream upstream of the biocide addition location, and
recombining the primary feed stream and the secondary feed stream downstream of the biocide addition location.

12. The method of claim 11, wherein:
dividing the feed stream comprising delivering the feed stream through a primary fluid pathway and extracting the secondary feed stream through a secondary fluid pathway fluidly connected to the primary fluid pathway;

the biocide addition location is positioned along the secondary fluid pathway; and recombining the secondary feed stream with the primary feed stream comprises delivering the secondary feed stream to a junction fluidly connecting the secondary fluid pathway fluidly to the primary fluid pathway.

13. The method of claim 1, wherein controlling addition of the biocide to the secondary feed stream based on the secondary feed stream biocide target concentration and the measured concentration of the biocide in the secondary feed stream comprises:

determining a difference between the secondary feed stream biocide target concentration and the measured concentration of the biocide in the secondary feed stream, and increasing or decreasing an amount of the biocide added to the secondary feed stream based on the difference.

14. The method of claim 1, wherein the membrane is a reverse osmosis membrane, and contacting the membrane with the recombined feed stream comprises generating a permeate stream and a concentrate stream.

15. The method of claim 1, further comprising:

measuring a metal ion concentration of a feed liquid providing the feed stream to provide a measured metal ion concentration;

comparing the measured metal ion concentration to a threshold; and if the measured metal ion concentration exceeds the threshold, initiating a pretreatment on the feed liquid upstream of the membrane to reduce the metal ion concentration in the feed stream.

16. The method of claim 15, wherein the threshold is a metal ion concentration of 0.2 ppm.

17. A system comprising:

a membrane;

a primary fluid pathway configured to supply a primary feed stream and a secondary fluid pathway configured to supply a secondary feed stream, the primary fluid pathway and the secondary fluid pathway joining together to provide a feed stream having a combined flow rate for supply to the membrane;

a biocide pump configured to introduce a biocide into the secondary fluid pathway at a biocide addition location;

a sensor configured to measure a concentration of a biocide in the secondary feed stream flowing through the secondary fluid pathway to provide a measured concentration of the biocide in the secondary feed stream, the sensor being positioned downstream of biocide addition location; and a controller communicatively coupled to the biocide addition pump and the sensor, the controller being configured to:

receive the measured concentration of the biocide in the secondary feed stream from the sensor, and control the biocide pump based on the measured concentration of the biocide in the secondary feed stream and a secondary feed stream biocide target concentration.

18. The system of claim 17, wherein the controller is further configured to receive a target biocide concentration for the feed stream and determine the secondary feed stream biocide target concentration based on the target biocide concentration.

19. The system of claim 18, wherein the controller is further configured to receive an indication of a flow rate of the feed stream to provide a measured feed stream flow rate, receive an indication of a flow rate of the secondary feed stream to provide a measured secondary feed stream flow rate, and determine the secondary feed stream biocide target concentration based on a ratio of the measured feed stream flow rate to the measured secondary feed stream flow rate.

20. The system of claim 19, further comprising a feed stream flow meter and a secondary feed stream flow meter, wherein the controller is configured to receive the indication of the flow rate of the feed stream from the feed stream flow meter and receive the indication of the flow rate of the secondary feed stream from the secondary feed stream flow meter.

21. The system of claim 19, wherein:

the controller is configured to determine the secondary feed stream biocide target concentration based at least to an equation:

$$C_{Side\,Target} = C_{Feed\,Target} \times \frac{Q_{Feed}}{Q_{Side}}$$

wherein $C_{Side\,Target}$ is the secondary feed stream biocide target concentration, $C_{Feed\,Target}$ is the target biocide concentration for the feed stream, $Q_{Feed}$ is the measured feed stream flow rate, and $Q_{Side}$ is the measured secondary feed stream flow rate, the target biocide concentration for the feed stream is less than 1 ppm, the secondary feed stream biocide target concentration is greater than 1 ppm, and the sensor has a measurement accuracy that varies after calibration by at least 0.1 ppm.

22. The system of claim 17, wherein the biocide is selected from the group consisting of chlorine, chlorine dioxide, chloramine, bromine, stabilized bromine, and combinations thereof.

* * * * *

UNITED STATES PATENT AND TRADEMARK OFFICE
CERTIFICATE OF CORRECTION

| | | |
|---|---|---|
| PATENT NO. | : 11,524,909 B2 | Page 1 of 1 |
| APPLICATION NO. | : 17/085905 | |
| DATED | : December 13, 2022 | |
| INVENTOR(S) | : Seong-Hoon Yoon et al. | |

It is certified that error appears in the above-identified patent and that said Letters Patent is hereby corrected as shown below:

In the Claims

Column 18, Claim 8, Line 46, delete "amperometic" and insert -- amperometric --

Signed and Sealed this
Thirteenth Day of June, 2023

Katherine Kelly Vidal
*Director of the United States Patent and Trademark Office*